(12) United States Patent
Musgrave et al.

(10) Patent No.: US 10,668,777 B2
(45) Date of Patent: Jun. 2, 2020

(54) STEER AXLE TIRE INFLATION SYSTEM

(71) Applicant: Equalaire Systems, Inc., Corpus Christi, TX (US)

(72) Inventors: Tim Musgrave, San Antonio, TX (US); Mark Kevin Hennig, Corpus Christi, TX (US)

(73) Assignee: Equalaire Systems, Inc., Corpus Christi, TX (US)

( * ) Notice: Subject to any disclaimer, the term of this patent is extended or adjusted under 35 U.S.C. 154(b) by 36 days.

(21) Appl. No.: 15/705,056

(22) Filed: Sep. 14, 2017

(65) Prior Publication Data

US 2018/0222258 A1   Aug. 9, 2018

Related U.S. Application Data

(63) Continuation of application No. 15/555,941, filed as application No. PCT/US2016/020940 on Mar. 4, (Continued)

(51) Int. Cl.
*B60C 23/00* (2006.01)
*B60T 5/00* (2006.01)
(Continued)

(52) U.S. Cl.
CPC .......... *B60C 23/003* (2013.01); *B60B 35/003* (2013.01); *B60C 23/002* (2013.01); *B60C 23/20* (2013.01); *B60C 29/06* (2013.01); *B60T 5/00* (2013.01); *B60T 17/22* (2013.01); *F16K 17/383* (2013.01); *B60B 2900/731* (2013.01); *Y10T 137/1797* (2015.04); *Y10T 137/8158* (2015.04); *Y10T 137/8326* (2015.04)

(58) Field of Classification Search
CPC ..... B60C 23/003; B60C 23/002; B60C 23/20; B60C 29/06; F16K 17/383; B60B 35/003; B60B 2900/731; B60T 17/22; B60T 5/00; Y10T 137/8158; Y10T 137/8326; Y10T 137/1797
USPC ........................................ 152/416, 417, 418
See application file for complete search history.

(56) References Cited

U.S. PATENT DOCUMENTS 1,054,504 A   2/1913   Burgraff, Jr.
1,072,907 A   9/1913   Brooks
(Continued)

FOREIGN PATENT DOCUMENTS

WO   WO2004080729 A2   9/2004
WO   WO2006/102017      9/2006
(Continued)

OTHER PUBLICATIONS

European Extended Search Report issued in related Application No. 16759591.7 based on PCT US2016/020940 (7 Pages).
(Continued)

*Primary Examiner* — S. Joseph Morano
*Assistant Examiner* — Jean W Charleston
(74) *Attorney, Agent, or Firm* — Pizarro Allen PC

(57) ABSTRACT

A steer axle spindle may have one or more channels formed therein. A rotary union may be mounted to a steer axle wheel end assembly. The rotary union may be sealingly connected to a pressurized fluid source through the channel, and sealingly connected to a vehicle tire.

14 Claims, 13 Drawing Sheets

Related U.S. Application Data 2016, now Pat. No. 10,471,782, and a continuation-in-part of application No. 14/980,659, filed on Dec. 28, 2015, now Pat. No. 9,789,730, which is a continuation of application No. 14/536,326, filed on Nov. 7, 2014, now Pat. No. 9,254,712, which is a continuation of application No. 13/808,940, filed as application No. PCT/US2011/044879 on Jul. 21, 2011, now Pat. No. 8,910,683.

(60) Provisional application No. 62/128,898, filed on Mar. 5, 2015, provisional application No. 61/368,960, filed on Jul. 29, 2010.

(51) Int. Cl.
*B60T 17/22* (2006.01)
*B60C 23/20* (2006.01)
*B60C 29/06* (2006.01)
*B60B 35/00* (2006.01)
*F16K 17/38* (2006.01)

(56) References Cited

U.S. PATENT DOCUMENTS

| | | | |
|---|---|---|---|
| 1,083,847 A * | 1/1914 | McDowell | B60C 23/003 152/417 |
| 1,112,596 A | 10/1914 | Burgraff, Jr. | |
| 1,165,057 A | 12/1915 | Bayly | |
| 1,205,504 A | 11/1916 | Bearce | |
| 1,800,780 A | 4/1931 | Daneel | |
| 2,107,405 A | 2/1938 | Williams | |
| 2,177,042 A | 10/1939 | Michael | |
| 2,685,906 A | 8/1954 | Williams | |
| 2,693,841 A | 11/1954 | Webster, Jr. | |
| 2,947,172 A | 11/1954 | King | |
| 2,854,018 A | 9/1958 | Kilmarx, Jr. | |
| 3,276,503 A | 10/1966 | Kilmarx | |
| 3,645,479 A | 2/1972 | Kostroun et al. | |
| 3,889,077 A | 6/1975 | Ayashi | |
| 3,898,638 A | 8/1975 | Deane et al. | |
| 4,004,271 A | 1/1977 | Haven et al. | |
| 4,058,185 A | 11/1977 | Ploeger | |
| 4,333,304 A | 6/1982 | Forgue et al. | |
| 4,387,931 A | 6/1983 | Bland | |
| 4,492,019 A | 1/1985 | Wells | |
| 4,685,501 A | 8/1987 | Williams | |
| 4,700,763 A | 10/1987 | Williams | |
| 4,812,826 A | 3/1989 | Kaufman et al. | |
| 4,883,106 A | 11/1989 | Schultz et al. | |
| 4,947,786 A | 8/1990 | Maynard et al. | |
| 5,287,906 A | 2/1994 | Stech | |
| 5,377,736 A | 1/1995 | Stech | |
| 5,381,090 A | 1/1995 | Adler et al. | |
| 5,413,159 A | 5/1995 | Olney et al. | |
| 5,429,167 A | 7/1995 | Jensen | |
| 5,492,393 A | 2/1996 | Peisker et al. | |
| 5,538,062 A | 7/1996 | Stech | |
| 5,540,268 A | 7/1996 | Mittal | |
| 5,553,647 A | 9/1996 | Jaksic | |
| 5,565,065 A | 10/1996 | Wang | |
| 5,584,773 A | 12/1996 | Kershaw et al. | |
| 5,584,949 A | 12/1996 | Ingram | |
| 5,587,698 A | 12/1996 | Genna | |
| 5,694,969 A | 12/1997 | DeVuyst | |
| 5,707,186 A | 1/1998 | Gobell et al. | |
| 5,769,979 A | 6/1998 | Naedler | |
| 5,868,881 A | 2/1999 | Bradley | |
| 5,947,172 A | 9/1999 | Glotin | |
| 5,959,365 A | 9/1999 | Mantini et al. | |
| 6,105,645 A | 8/2000 | Ingram | |
| 6,131,631 A | 10/2000 | Bradley | |
| 6,145,559 A | 11/2000 | Ingram | |
| 6,167,900 B1 | 1/2001 | Laird | |
| 6,244,316 B1 * | 6/2001 | Naedler | B60C 23/003 152/417 |
| 6,283,186 B1 | 9/2001 | Krisher | |
| 6,325,123 B1 | 12/2001 | Gao et al. | |
| 6,325,124 B1 | 12/2001 | Colussi et al. | |
| 6,394,556 B1 | 5/2002 | Ingram | |
| 6,401,743 B1 | 6/2002 | Naedler | |
| 6,425,427 B1 | 7/2002 | Stech | |
| 6,435,238 B1 | 8/2002 | Hennig et al. | |
| 6,546,892 B2 | 4/2003 | Kelly, Jr. et al. | |
| 6,585,019 B1 | 7/2003 | Ingram | |
| 6,668,888 B1 | 12/2003 | Beesley et al. | |
| 6,670,890 B2 | 12/2003 | Kyrtsos et al. | |
| 6,698,482 B2 | 3/2004 | Hennig et al. | |
| 6,759,963 B2 | 7/2004 | Hayes | |
| 6,772,812 B1 | 8/2004 | Hamilton | |
| 6,892,778 B2 | 5/2005 | Hennig et al. | |
| 6,938,658 B2 | 9/2005 | Jarrett et al. | |
| 7,191,796 B1 | 3/2007 | Rehmart, Jr. | |
| 7,207,365 B2 * | 4/2007 | Nelson | B60C 23/003 152/415 |
| 7,273,082 B2 | 9/2007 | White et al. | |
| 7,302,979 B2 | 12/2007 | Davison et al. | |
| 7,404,412 B2 | 7/2008 | Milanovich et al. | |
| 7,416,005 B2 | 8/2008 | Hennig et al. | |
| 7,418,989 B2 | 9/2008 | Ingram | |
| 7,652,562 B2 | 1/2010 | White et al. | |
| 7,690,412 B1 | 4/2010 | Jenkinson et al. | |
| 7,896,045 B2 | 3/2011 | Solie et al. | |
| 7,975,739 B1 | 7/2011 | Ingram | |
| 7,992,610 B2 | 8/2011 | Collet et al. | |
| 8,186,403 B2 | 5/2012 | Sonzala et al. | |
| 8,191,594 B2 | 6/2012 | Saadat | |
| 8,910,683 B2 | 12/2014 | Hennig | |
| 2002/0189670 A1 | 12/2002 | Peach | |
| 2004/0000364 A1 | 1/2004 | Henig et al. | |
| 2004/0173296 A1 * | 9/2004 | White | B60C 23/003 152/417 |
| 2004/0244896 A1 * | 12/2004 | Jarrett | B60C 23/003 152/417 |
| 2006/0207705 A1 * | 9/2006 | Davison | B60C 23/003 152/415 |
| 2006/0231184 A1 * | 10/2006 | Beverly | B60C 23/003 152/417 |
| 2007/0227640 A1 | 10/2007 | Ingram | |
| 2009/0084481 A1 | 4/2009 | Kalavatz | |
| 2009/0283190 A1 * | 11/2009 | Padula | B60C 23/003 152/417 |
| 2009/0284362 A1 | 11/2009 | Wilson et al. | |
| 2012/0024445 A1 | 2/2012 | Wilson et al. | |
| 2012/0032793 A1 * | 2/2012 | Sonzala | B60C 23/18 340/449 |
| 2013/0087262 A1 * | 4/2013 | Hennig | B60C 23/00 152/417 |
| 2014/0196812 A1 * | 7/2014 | Musgrave | B60C 23/003 141/4 |
| 2014/0261941 A1 | 9/2014 | Knapke et al. | |

FOREIGN PATENT DOCUMENTS

| | | |
|---|---|---|
| WO | WO2011/163274 | 12/2011 |
| WO | WO2012/015669 | 2/2012 |
| WO | WO2012/084912 | 6/2012 |

OTHER PUBLICATIONS

IFS Series Independent Front Air-Ride Suspension Maintenance Manual, XL-AK397-01 Rev. C., SAF Holland, Inc., Oct. 2007, (32 pages).

International Preliminary Report on Patentability issued in corresponding PCT Patent App. No. PCT/US2011/044879 dated Jan. 29, 2013, (7 pages).

(56) References Cited

OTHER PUBLICATIONS

International Preliminary Report on Patentability issued in corresponding PCT Patent App. No. PCT/US2016/020940 dated May 20, 2016, (16 pages).

* cited by examiner

STEER AXLE TIRE INFLATION SYSTEM

CROSS-REFERENCE TO RELATED APPLICATION

This application is a continuation of U.S. patent application Ser. No. 15/555,941 filed Sep. 5, 2017 and entitled "Steer Axle Tire Inflation System," which is a national stage entry of PCT Patent Application No. PCT/US2016/020940 filed Mar. 4, 2016 and entitled "Steer Axle Tire Inflation System," which is a continuation-in-part of U.S. patent application Ser. No. 14/980,659 filed Dec. 28, 2015 and entitled "Steer Axle High-Temperature Warning System," and which issued as U.S. Pat. No. 9,789,730 on Oct. 17, 2017, which claims priority to U.S. Provisional Patent Application Ser. No. 62/128,898 filed Mar. 5, 2015 and entitled "Steer Axle Tire Inflation System," and is a continuation of U.S. patent application Ser. No. 14/536,326 filed Nov. 7, 2014 and entitled "Steer Axle High-Temperature Warning System," and which issued as U.S. Pat. No. 9,254,712 on Feb. 9, 2016, which is a continuation of U.S. patent application Ser. No. 13/808,940 filed Apr. 23, 2013 and entitled "Steer Axle High-Temperature Warning System," and which issued as U.S. Pat. No. 8,910,683 on Dec. 16, 2014, which is a national stage entry of PCT Patent Application No. PCT/US2011/044879 filed on Jul. 21, 2011 and entitled "Steer Axle High-Temperature Warning System," which claims priority to U.S. Provisional Patent Application No. 61/368,960 entitled "Steer-Axle High-Temperature Warning System" filed Jul. 29, 2010, all of which are hereby incorporated in their entirety by reference.

FIELD

The disclosed system relates generally to tire inflation systems for vehicle steer axles.

BACKGROUND

There exists a need for a tire inflation system suitable for a vehicle steer axle.

SUMMARY

A tire inflation system for a steer-axle wheel end assembly having a steer-axle spindle and a tire may comprise a pressurized fluid supply; the steer-axle spindle may be pivotably mounted to a steer axle, the steer-axle spindle may have an inner face facing the steer axle and having an outer end, the steer-axle spindle may form an axial channel along the central axis of the steer-axle spindle, the axial channel may extend from the inner face to the outer end and in sealed fluid communication with the pressurized fluid supply; and a rotary union may be sealingly mounted to the axial channel at an outer end of the steer-axle spindle, the rotary union being in sealed fluid communication with the pressurized fluid supply and with the tire.

A method of providing a tire inflation system for a steer-axle wheel end assembly having a tire and a steer-axle spindle pivotably mounted to a steer axle may comprise forming an axial channel along the central axis of the steel axle spindle from an outer end to an inner face facing the steer axle; mounting a rotary union to said wheel end assembly; providing sealed fluid communication from the rotary union to a pressurized fluid supply through the axial channel; and providing sealed fluid communication from the rotary union to the tire.

A method of providing a tire inflation system for a steer-axle wheel end assembly having a tire and a steer-axle spindle pivotably mounted to a steer axle may comprise forming a cross-channel from an outer surface of the steer axle spindle to a central axis of the steer-axle spindle; forming an axial channel along the central axis of the steer-axle spindle from an outer end to the cross-channel; mounting a rotary union to said wheel end assembly; providing sealed fluid communication from the rotary union to a pressurized fluid supply through the axial channel and the cross-channel; and providing sealed fluid communication from the rotary union to the tire.

A method of providing a tire inflation system for a steer-axle wheel end assembly having a tire and a steer-axle spindle pivotably mounted to a steer axle may comprise mounting a rotary union to said wheel end assembly; providing sealed fluid communication from the rotary union to a pressurized fluid supply through an axial channel extending along the central axis of the steer-axle spindle from an outer end to an inner face facing the steer axle; and providing sealed fluid communication from the rotary union to the tire.

A method of providing a tire inflation system for a steer-axle wheel end assembly having a tire and a steer axle spindle pivotably mounted to a steer axle may comprise mounting a rotary union to said wheel end assembly; providing sealed fluid communication from the rotary union to a pressurized fluid supply through a cross-channel extending from an outer surface of the steer-axle spindle to a central axis of the steer-axle spindle and through an axial channel extending along the central axis of the steer-axle spindle from an outer end to the cross-channel; and providing sealed fluid communication from the rotary union to the tire.

In a tire inflation system for a steer-axle wheel end assembly having a tire mounted to a steer-axle spindle pivotably connected to a steer axle, the steer-axle spindle having a channel formed therein, the system may comprise a rotary union mounted to the steer-axle wheel end assembly, the rotary union being in sealed fluid communication with a pressurized fluid supply through the channel and with the tire.

DETAILED DESCRIPTION

Figure 1:
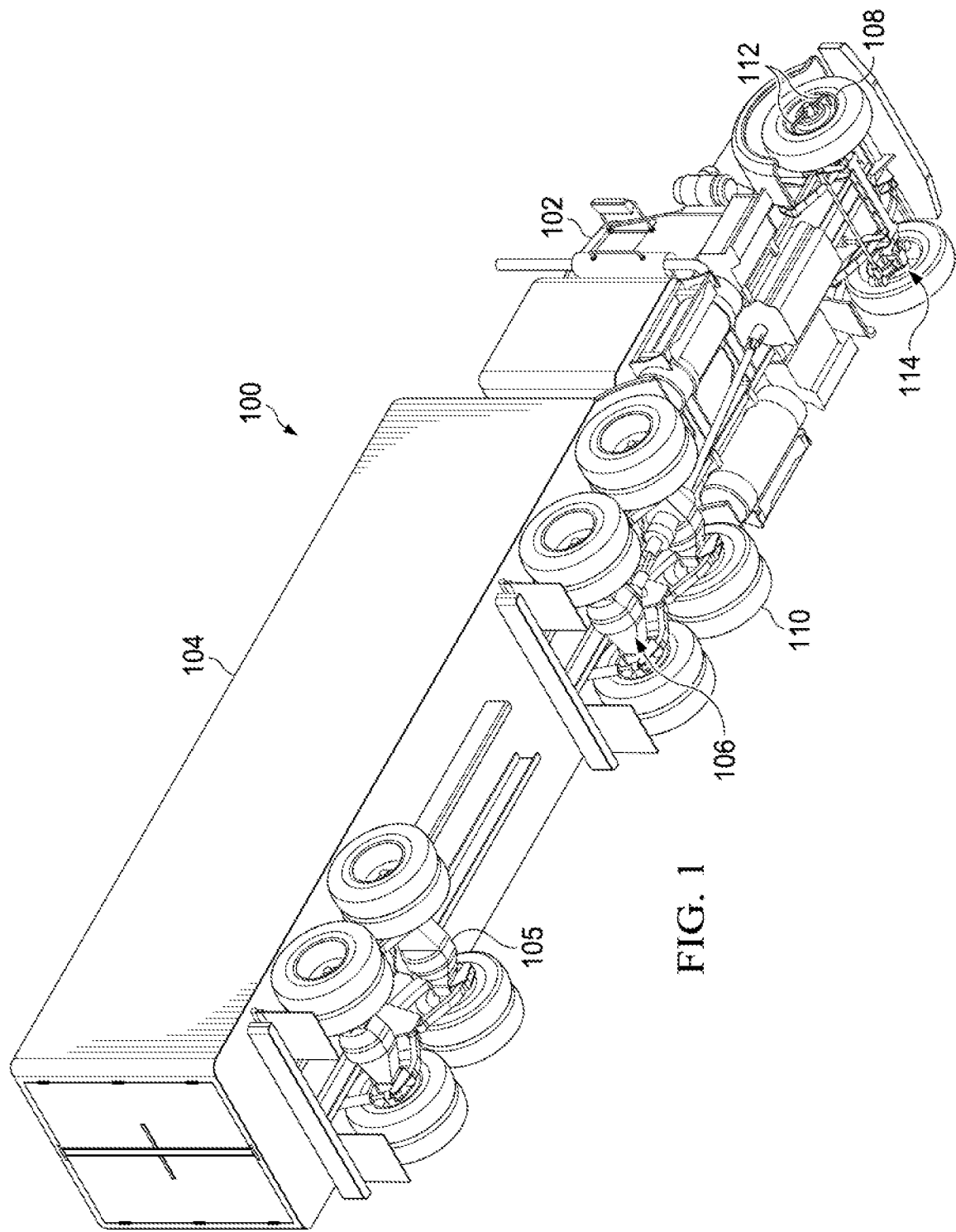
FIG. 1 illustrates one embodiment of a vehicle that may use a steer-axle tire inflation system.

As may be seen in FIG. 1, a vehicle 100 may comprise a truck 102 and trailer 104. The truck 102 may include one or more drive axles 106 as part of the vehicles powertrain. The truck 102 may further include a steer axle 114 having pivoting hubs that provide steering capability for the vehicle 100. The trailer 104 may include one or more fixed axles 105. Each axle may have one or more wheels mounted thereto with a tire mounted to each wheel. Of course, other types of steerable vehicles, such as cars and buses may be provided with the tire inflation system disclosed herein.

Figure 2:
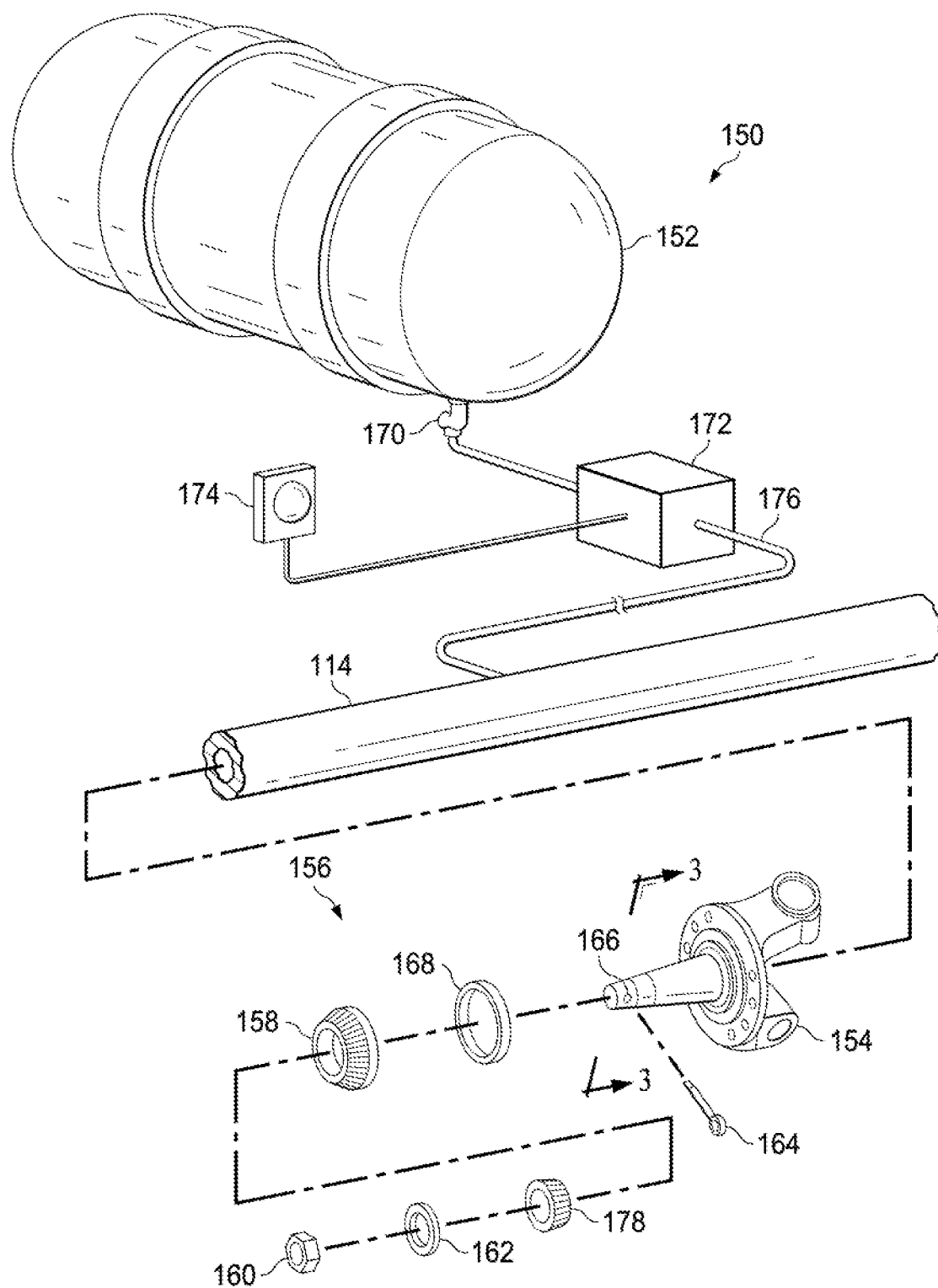
FIG. 2. illustrates an exploded view of one embodiment of a steer-axle tire inflation system.

Referring now primarily to FIG. 2, a vehicle may include a wheel-end tire inflation system 150 and a steer axle 114 having a wheel spindle 154 on which a steer-axle wheel-end assembly 156 may be mounted. The vehicle 100 may be provided with a pressurized air supply 152 used to provide pressurized air to brakes (not shown).

Figure 4:
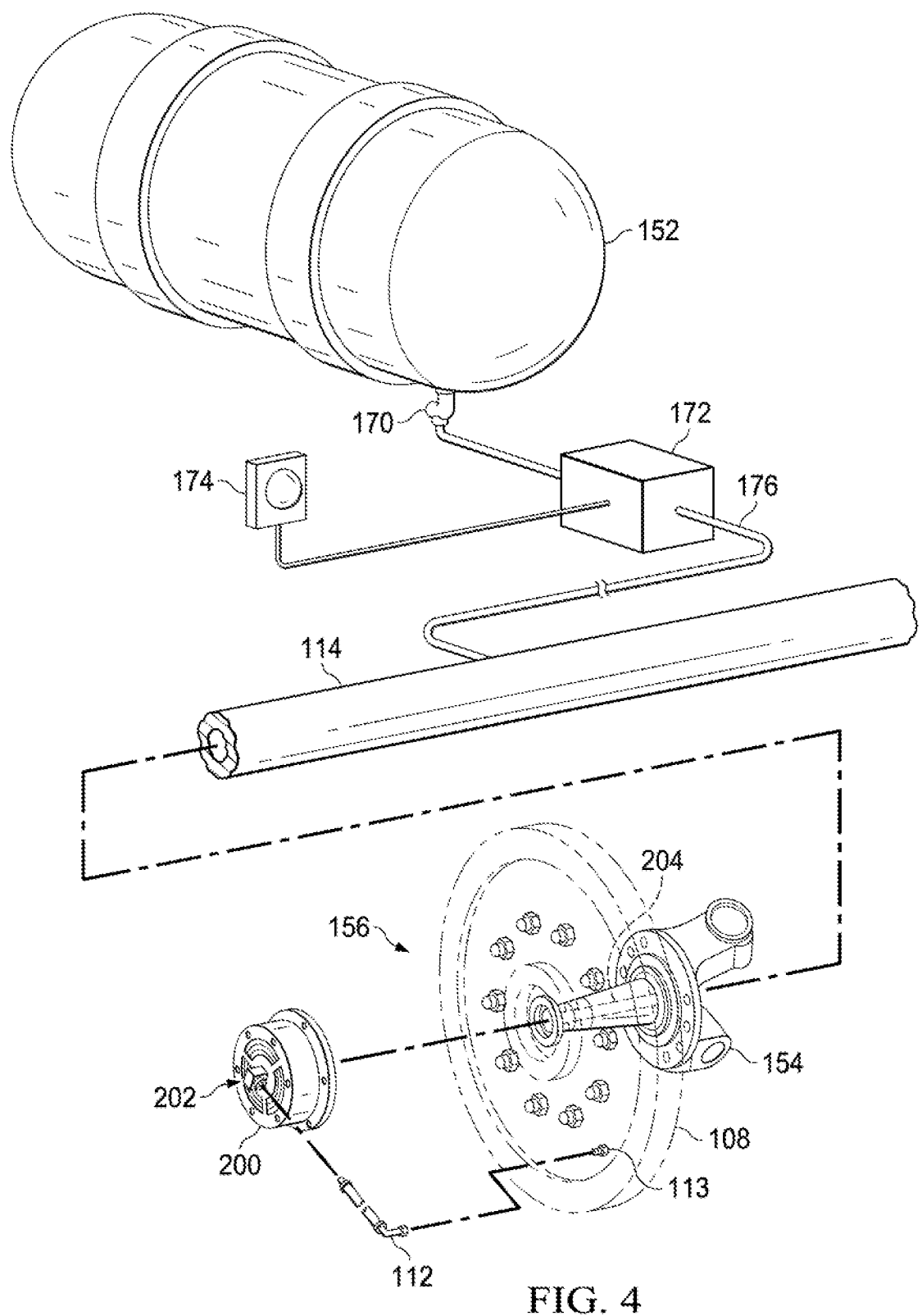
FIG. 4 illustrates a partially exploded view of one embodiment of a steer-axle tire inflation system with an automatic tire inflation system.

The steer-axle wheel end assembly 156 may include a hub (not shown) which may rotate on inner bearings 158 and outer bearings 178. A wheel 108, tire 110 (as shown in FIGS. 1 and 4) and hubcap may be mounted to the hub. A brake drum (not shown) may be integrally formed with the hub, or otherwise mounted to the hub.

The outer bearings 178 may be retained on the wheel spindle 154 by a spindle nut 160. A washer 162 may be mounted between the spindle nut 160 and outer bearing 178. A cotter pin 164 may be inserted through a receiving hole 166 in the end of the wheel spindle 154 so as to prevent the spindle nut 160 from becoming unscrewed from the wheel spindle 154. The wheel spindle 154 may be pivotally mounted to the front steer axle 114 via a knuckle post assembly (not shown).

An oil seal 168 may be mounted to the wheel spindle 154 adjacent the inner bearing 158 so as to prevent loss of lubricant through the inner bearing 158. A hub cap 200 (as shown in FIG. 4) may be mounted to the hub, thus generally sealing the bearings 158 and 178 from debris and preventing loss of lubrication.

The tire inflation system 150 may include the air pressure supply 152, such as that typically provided on a truck 102 or vehicle 100 for various purposes such as air brakes; a pressure protection valve 170; a flow switch 172; and an indicator or warning system light 174. An air conduit 176 may connect the air pressure supply 152 to the wheel spindle 154 (as shown in the embodiments of other drawing figures). In some embodiments, the air conduit 176 may run through a hollow front steer axle 114. In some embodiments, the air conduit 176 may run alongside the front steer axle 114. In some embodiments, the hollow front steer axle 114 may be bored or plugged at each end (not shown), and the air conduit 176 may be connected to the hollow front steer axle 114 so as to use the hollow front steer axle 114 as part of the air conduit or pressure supply. In such embodiments, a portion of the air line (not shown) may extend from an axle plug (not shown) to the inner face 254 of the wheel spindle 154 to provide fluid communication between the air pressure supply 152 and the rotary union 202.

Figure 3:
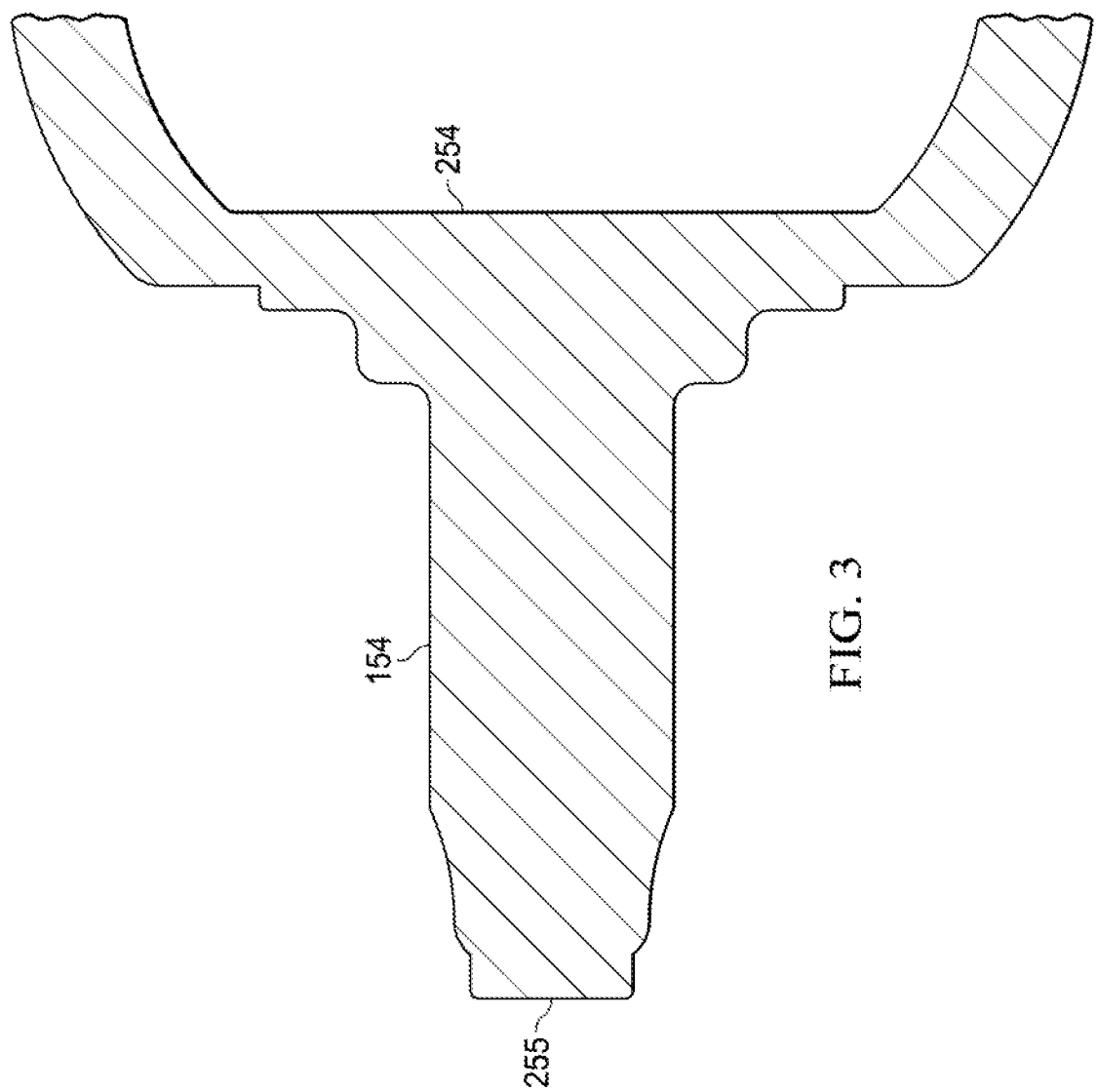
FIG. 3 illustrates a cut-away view a one embodiment of a wheel spindle.

FIG. 3 shows a cross section of the exemplary wheel spindle 154 of FIG. 2. The wheel spindle may be solid as provided by an OEM. As may be seen in the embodiment of FIG. 5, for example, the spindle may be bored along its central axis to provide an axial channel 204 for fluid communication with the air conduit 176. The axial channel may extend all the way through the spindle from the inner face 254 to the outer end 255, such as is shown in the embodiment of FIG. 5.

Figure 12:
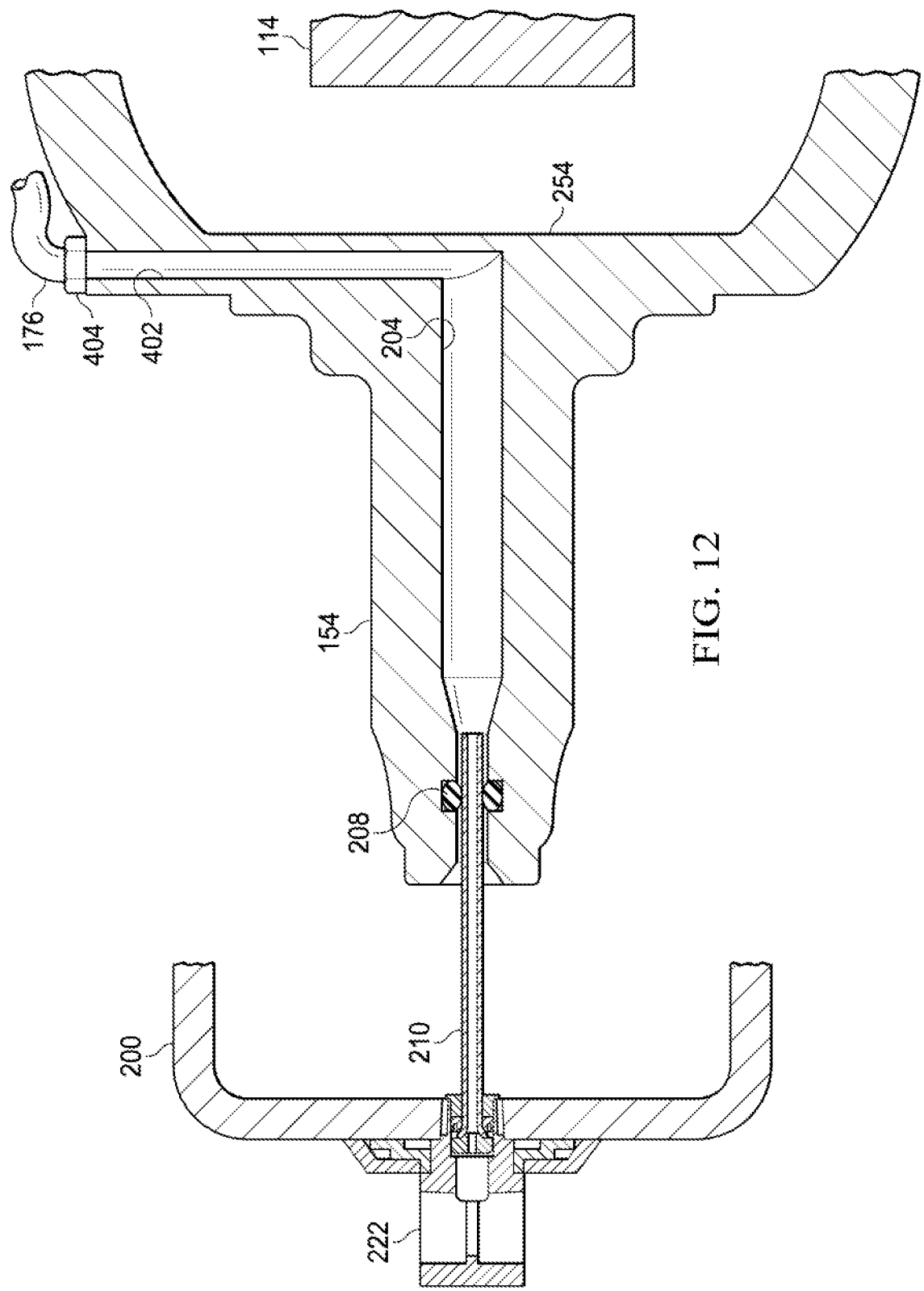
FIG. 12 illustrates a cut-away side view of another embodiment of a steer-axle tire inflation system.
Figure 13:
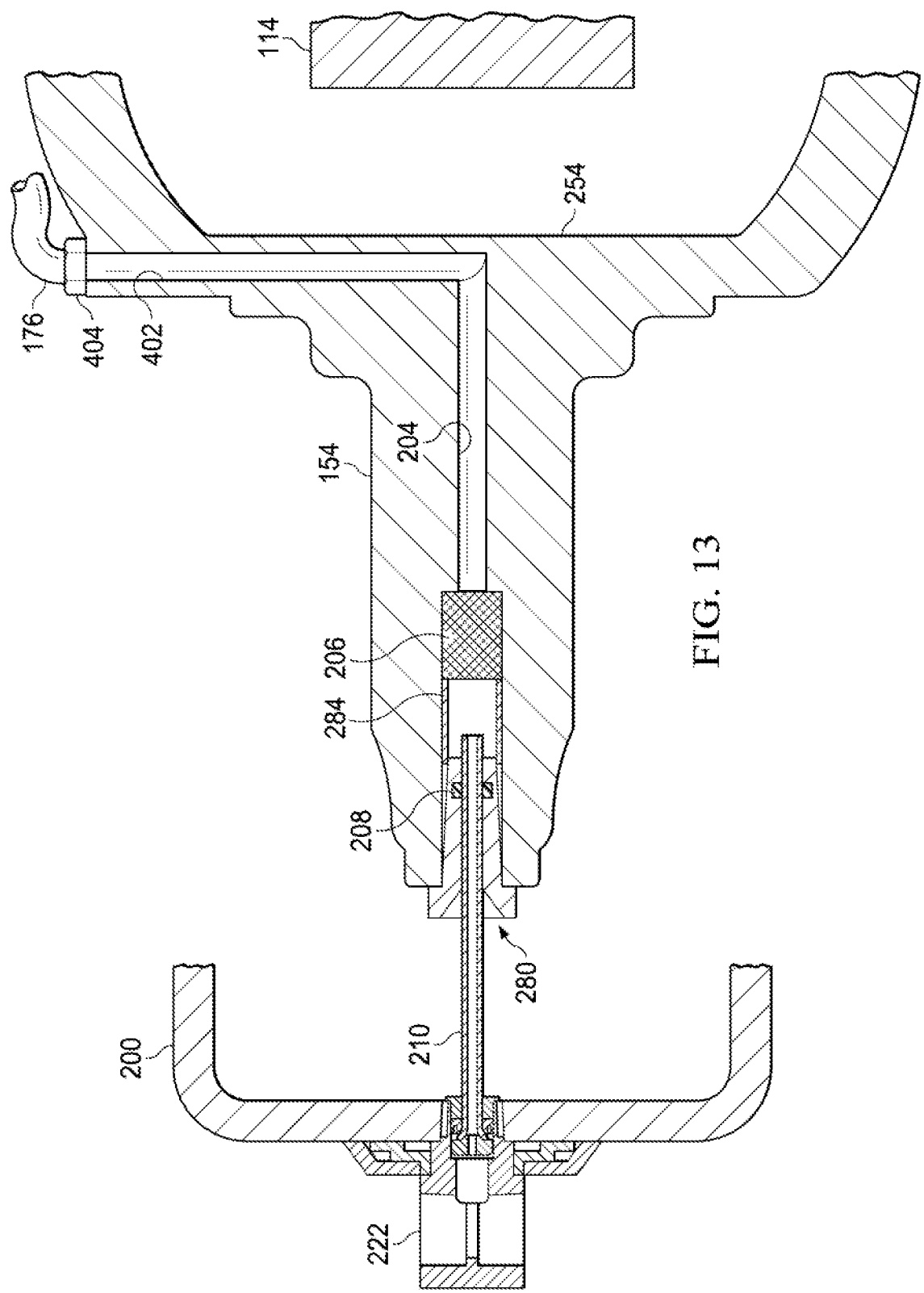
FIG. 13 illustrates a cut-away side view of another embodiment of a steer-axle tire inflation system.

In other embodiments, the spindle 154 may be radially cross-drilled to provide a radial channel 402 such as is shown in the embodiment of FIGS. 12 and 13. In such an embodiment, the axial channel 204 may not extend all the way to the inner surface 254 of the spindle. The axial channel may extend only partway along the central axis until it meets the radial channel 402. Alternatively, if the axial channel 204 extends all the way through to the inner face 251, then the axial channel 204 opening at the inner surface 254 may be sealed so as to allow air to pass from the outer end of the spindle from the radial channel 402.

Thus, the air conduit 176 may be sealingly connected to the axial channel 204 at the inner surface 254 of the spindle 154, or sealingly connected to the radial channel 402. Any suitable fitting may be used to sealingly connect the air conduit 176 to the axial channel or to the radial channel 402 (such as fitting 404).

Figure 5:
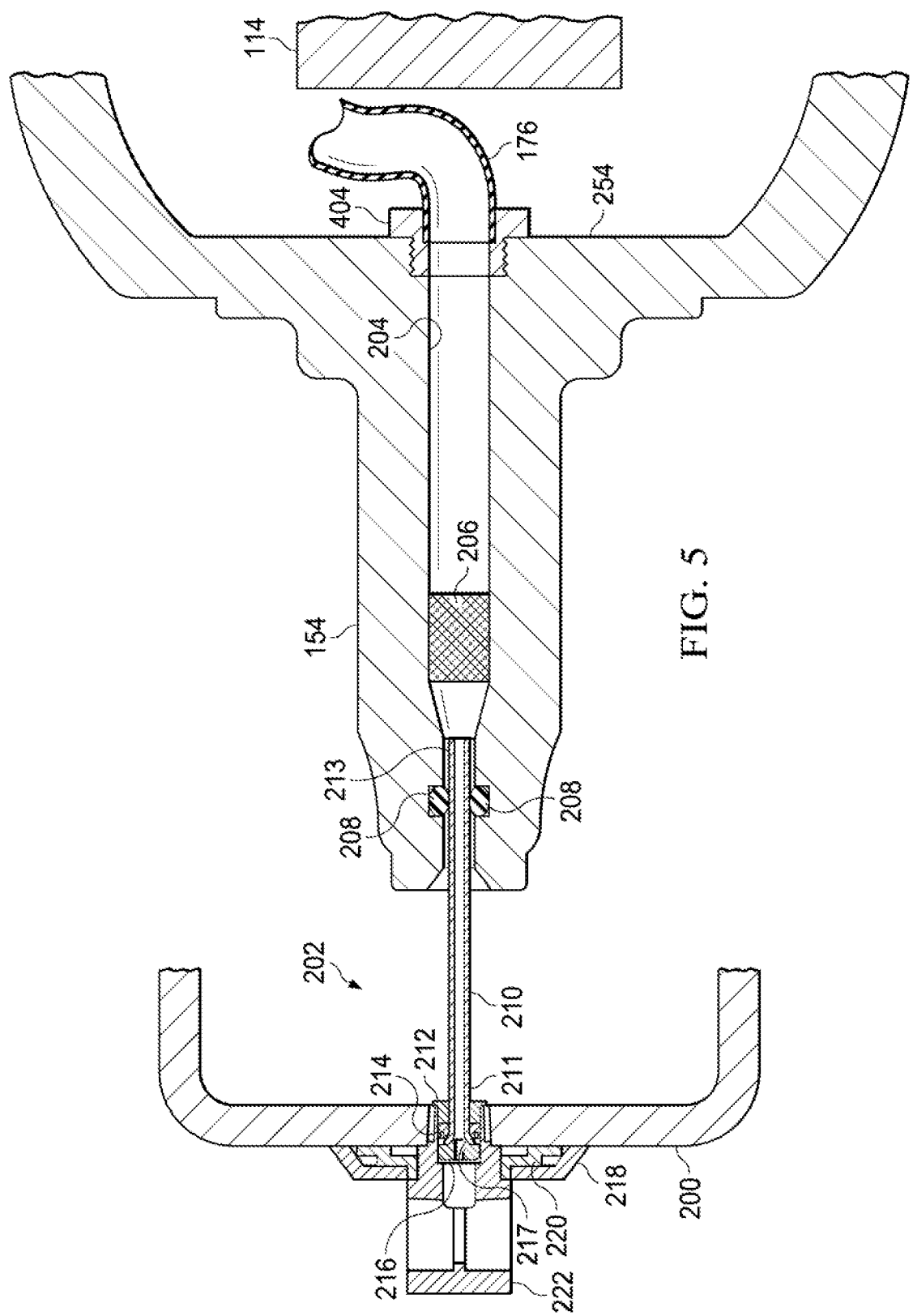
FIG. 5 illustrates a cut-away side view of one embodiment of a steer-axle tire inflation system.

Now referring to FIGS. 4 and 5, a rotary union 202 may be provided for supplying air from an air pressure supply 152 in an automatic tire inflation system through one or more air hoses 112 to a rotating tire (not shown) mounted to wheel 108. A hubcap 200 may be provided at each end of the wheel spindle 154 for retaining lubricant in or protecting the wheel bearings (not shown). An air conduit 176 may supply air to the rotary union 202 through an axial channel 204 in the wheel spindle 154. The rotary union 202 may be supported and positioned in the center end of the wheel spindle 154, and may sealingly engage the interior of the wheel spindle 154 if pressurizing fluid is injected directly into the axial channel 204 of the wheel spindle 154.

In some embodiments, the axial channel 204 may include a filter 206 to remove debris that may be carried through the axial channel 204. The passageway 204 may be in fluid communication with the air pressure supply 152 through air conduit 176. A first annular seal 208 may be supported in and encircle the passageway 204.

As shown more particularly in FIG. 5, the rotary union 202 may include a rotatable part including a tubular member 210 having a first end 211 and a second end 213. The second end 213 of the tubular member 210 may be coaxially extendable through and longitudinally movable in the passageway 204, and may sealably engage a first annular seal 208 disposed in the passageway 204 so as to allow sealed fluid communication with the air pressure supply 152 through air conduit 176.

The first annular seal 208 may provide a rotating or non-rotating seal and a pivotable or non-pivotable sealing engagement with the tubular member 210. In other words, depending on the configuration of the first annular seal 208, the tubular member 210 may or may not rotate in the seal 208. The first end 211 of the tubular member 210 may be sealably connected through a second annular seal 214 to an air connection 222 or tee-body mounted on the hub cap 200. The second annular seal 214 may provide a rotating or non-rotating seal and a pivotable or non-pivotable sealing engagement. In other words, depending on the configuration of the second annular seal 214, the tubular member 210 may or may not rotate in the seal 214. However, the tubular member 210 should be permitted to rotate in at least one or the other of annular seals 208 and 214, if not in both. Furthermore, the tubular member 210 may be rigid, or flexible, or may include both a flexible portion and a rigid portion. The tubular member 210 may include a flexible joint or coupling. The annular seals may comprise o-rings, washers, lip seals, face seals, or any suitable sealing interface, and may comprise a variety of materials, such as rubber, silicone, graphite, and steel or any other suitable sealing material or interface.

The air connection 222 may be provided on the hub cap 200 for communicating air to the tire or tires 110 (seen in FIG. 1) via an air hose 112 (seen in FIG. 4) connected to the wheel valves 113 (seen in FIG. 4). The first end 211 of the tubular member 210 may include a shoulder 217 that co-acts with a bearing 216. In operation, air may be supplied to the tires through the rotary union 202. The hubcap 200 and air connection 222 may rotate with the wheels 108 relative to the wheel spindle 154. The tubular member 210 may rotate, as well, in some embodiments. Air may flow from the pressure supply 152 through a filter 206 into the tubular member 210 of the rotary union 202 to the air connection 222. Air may flow from the air connection 222 through air hoses 112 and tire valves 113 into the tires. Of course, if the tire inflation system provides for tire deflation, air may flow in the reverse direction from that just described.

In some embodiments, one or more of the tire valves 113 may comprise breakaway tire valves, such as the SUREVALVE™ valve stem made by Haltec Corporation. A breakaway tire valve may comprise a valve core that sits subriminal in the base of the valve stem. If the part of the valves stem exposed outside the wheel rim is broken off, severed or damaged, the valve core inside the wheel rim may maintain fluid pressure in the tire. Connecting air hoses 112 to the tire valves 113 may increase the likelihood that one or more of the tire valves 113 may be damaged. Thus, a breakaway tire valve may reduce the likelihood that damage to the tire valve will catastrophically deflate a tire.

Figure 6:
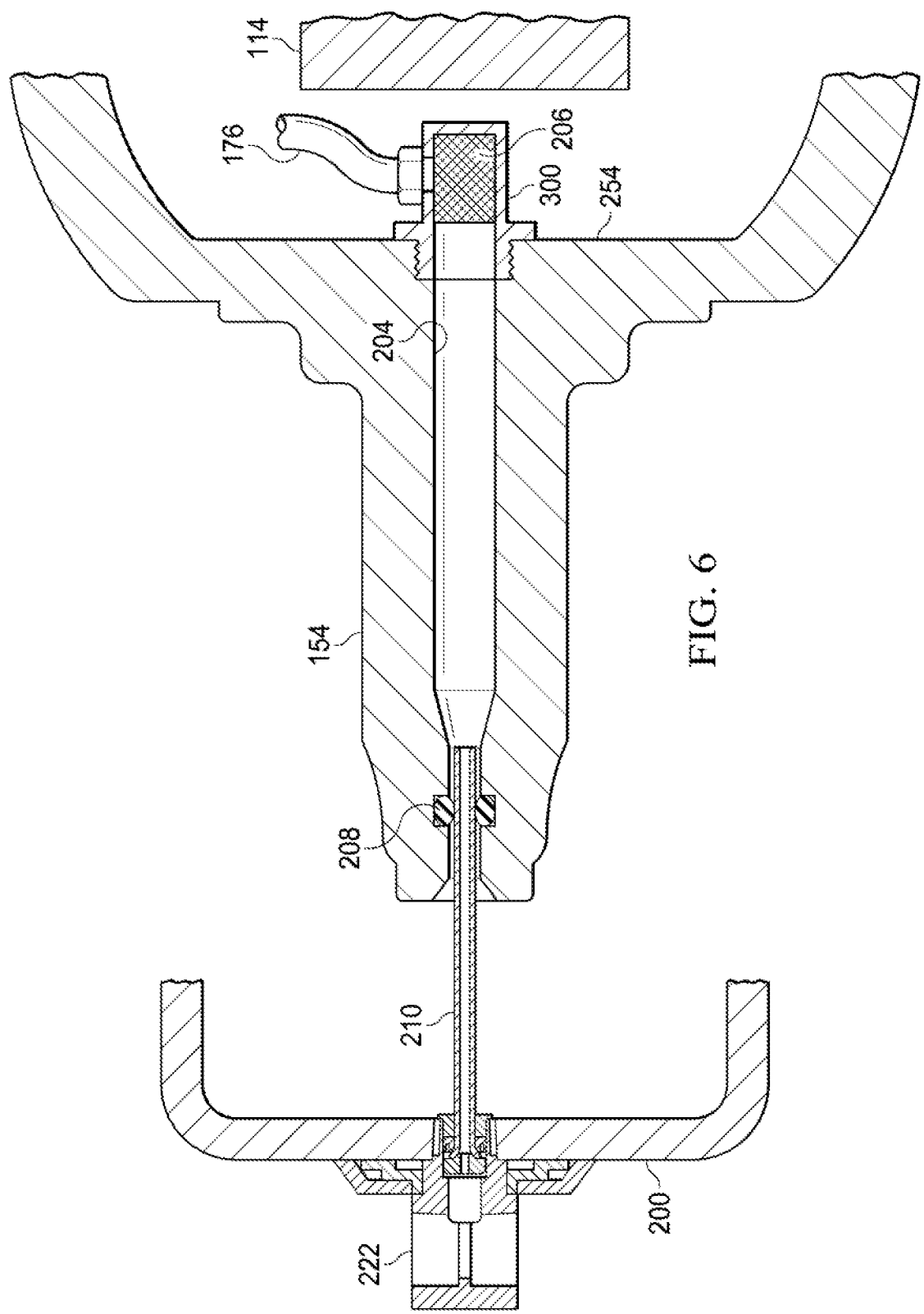
FIG. 6 illustrates a cut-away side view of another embodiment of a steer-axle tire inflation system.
Figure 7:
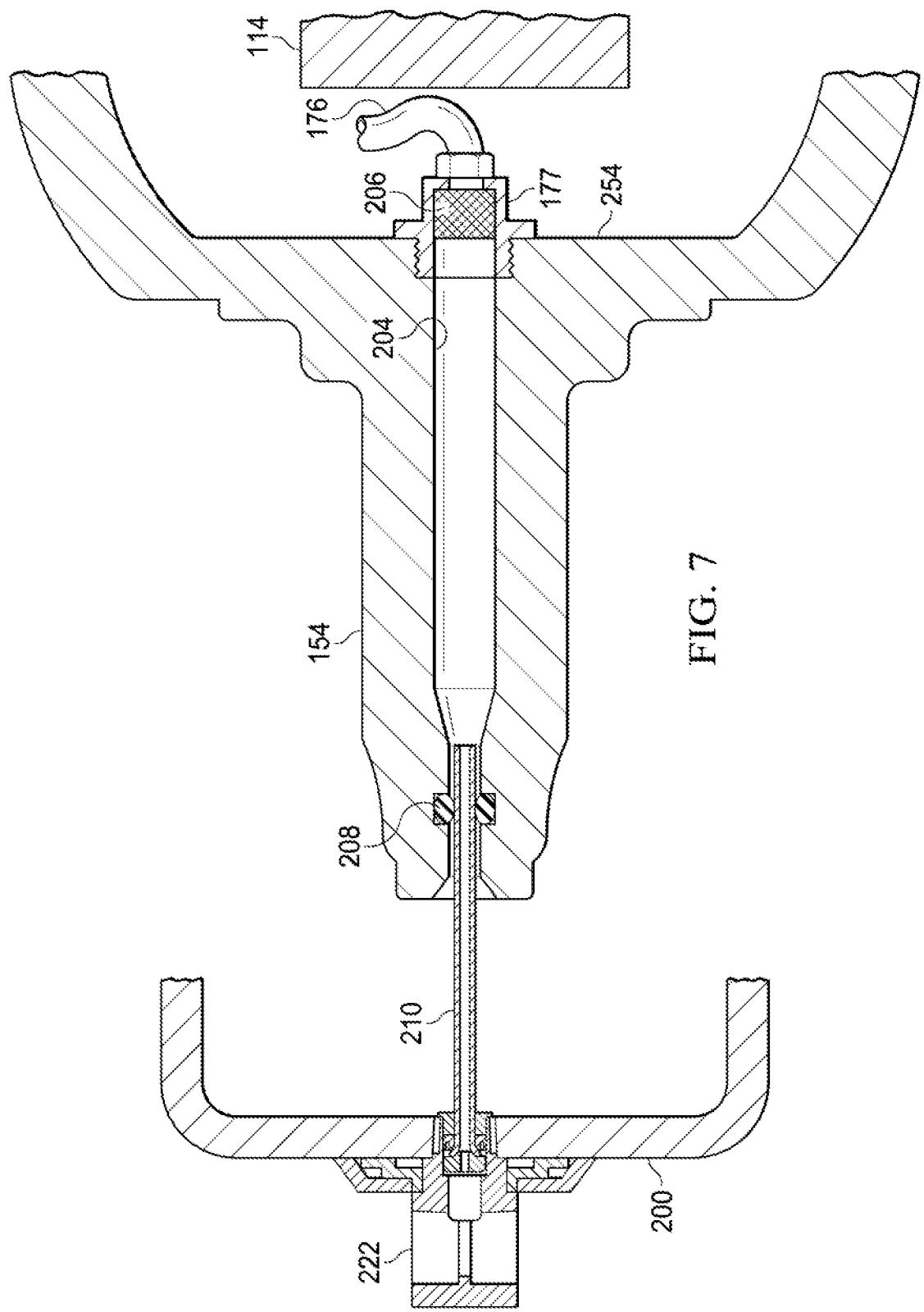
FIG. 7 illustrates a cut-away side view of another embodiment of a steer-axle tire inflation system.
Figure 8:
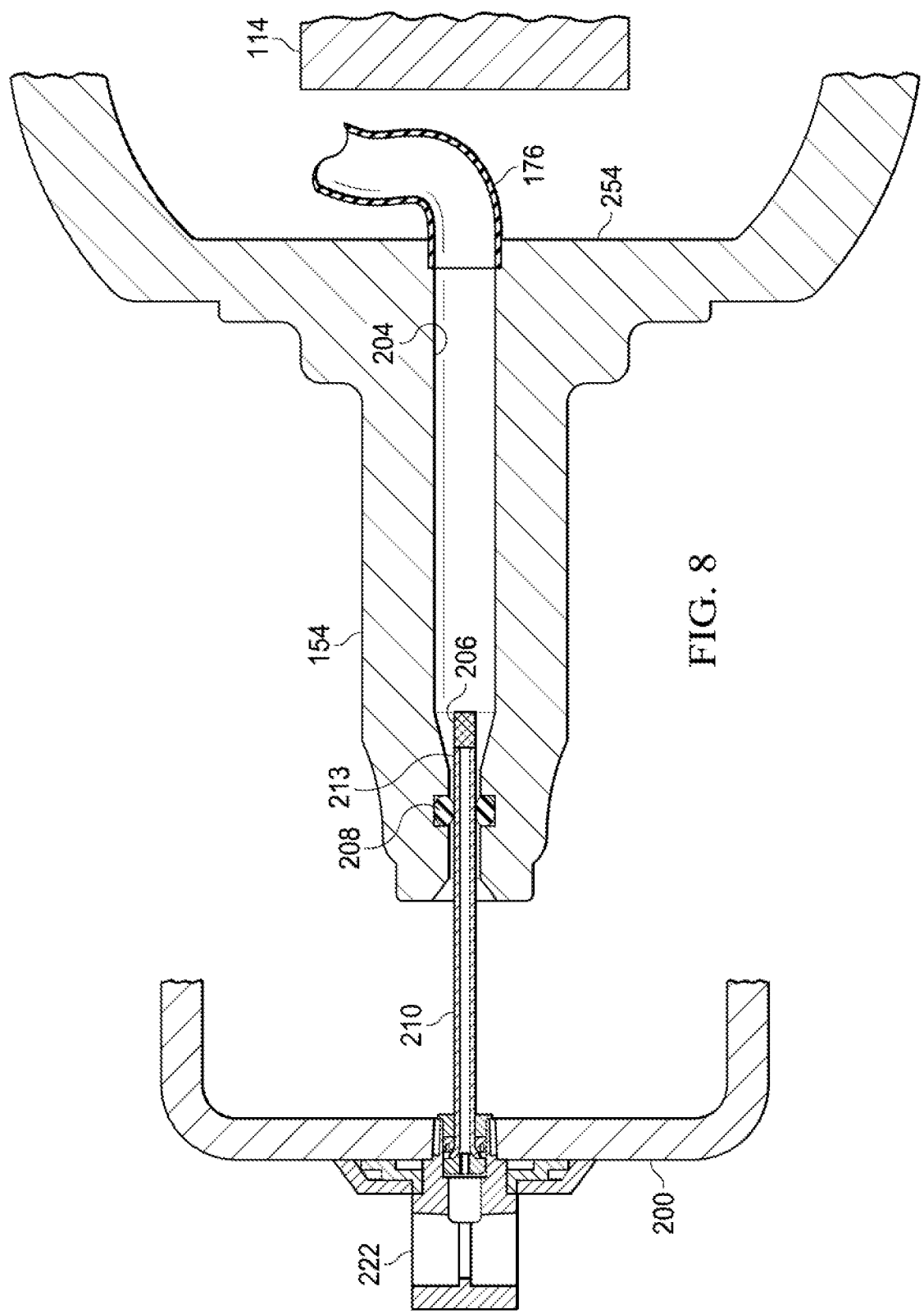
FIG. 8 illustrates a cut-away side view of another embodiment of a steer-axle tire inflation system.

The filter 206, if used, may be disposed at a variety of points. For example, as seen in the embodiment of FIG. 6, a filter may be provided in a filter block 300 mounted to the inner surface 254 of the spindle 154 at the opening to the axial channel 204. The conduit 176 may be connected to the filter block 300 to allow pressurized fluid to pass through the filter 206 into the axial channel 204. In other embodiments, as in FIG. 7, the conduit 176 may be provided with or include a filter fitting portion 177 that contains the filter 206. In yet further embodiments, such as that of FIG. 8, a filter 206 may be disposed at the second end 213 of the tubular member 210. In some embodiments, a filter need not be used if the fluid channels are adequately cleaned of debris.

Figure 9:
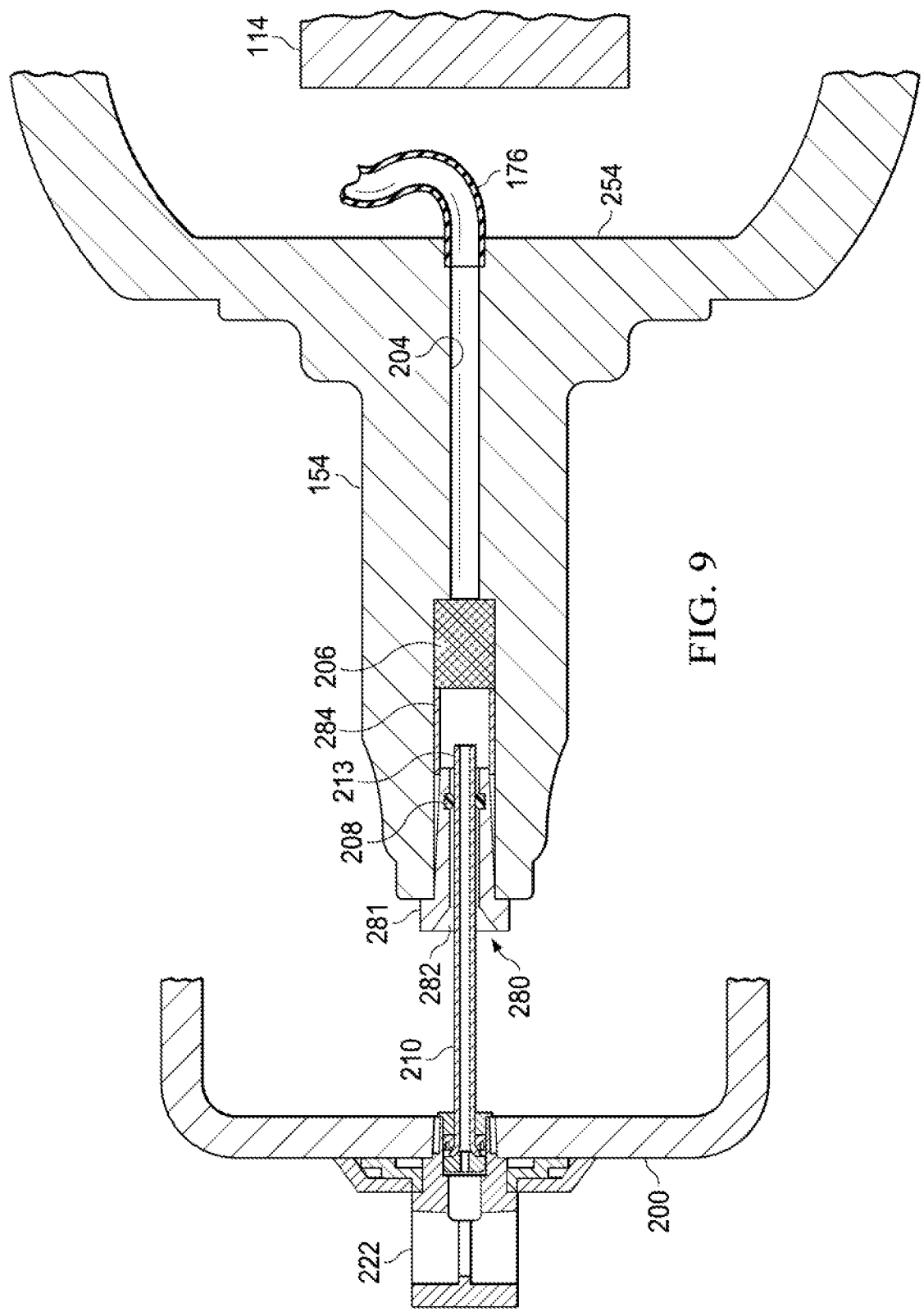
FIG. 9 illustrates a cut-away side view of another embodiment of a steer-axle tire inflation system.
Figure 10:
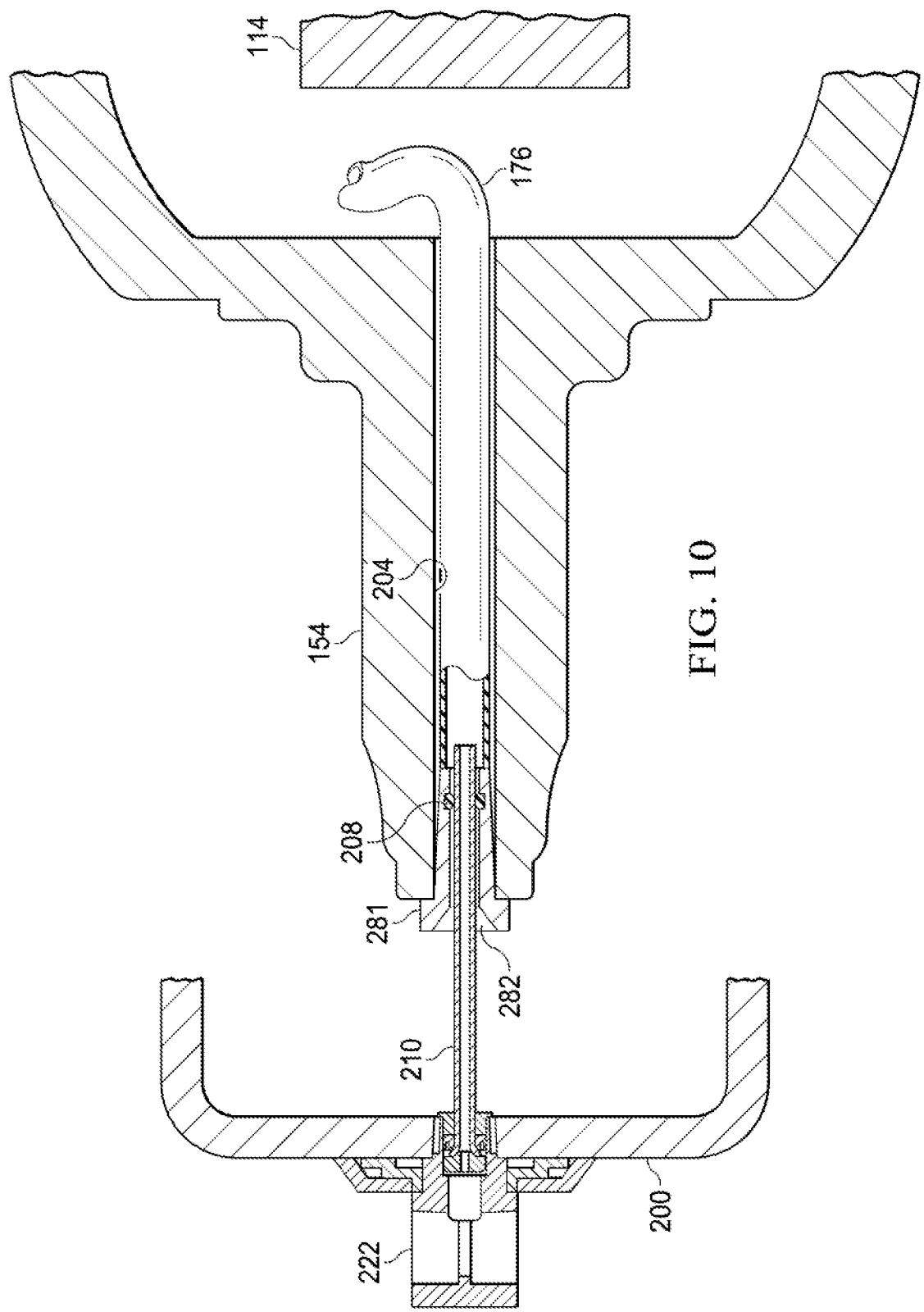
FIG. 10 illustrates a cut-away side view of another embodiment of a steer-axle tire inflation system.

In other embodiments, such as in FIG. 9, a stator 280 may be sealingly disposed in the axial channel 204. The stator may comprise a stator body 281 having a bore 282 extending therein along the central axis. The bore 282 may have an annular seal 208 disposed therein, in which the second end 213 of the tubular member 210 may be rotatably or non-rotatably disposed in the manner described above. A stator tube 284 may be sealingly affixed to the stator body 281, and a filter 206 may be disposed at the end of the stator tube 284. Pressurized fluid may pass from the conduit 176 into the axial channel 204, through the filter 206 and into the tubular member 210. In other embodiments, such as in FIG. 10, the conduit 176 may sealingly connect directly to a stator body 281. The air conduit 176 may extend through the axial channel 204 so that the axial channel 204 does not serve as a sealed air conduit.

Figure 11A:
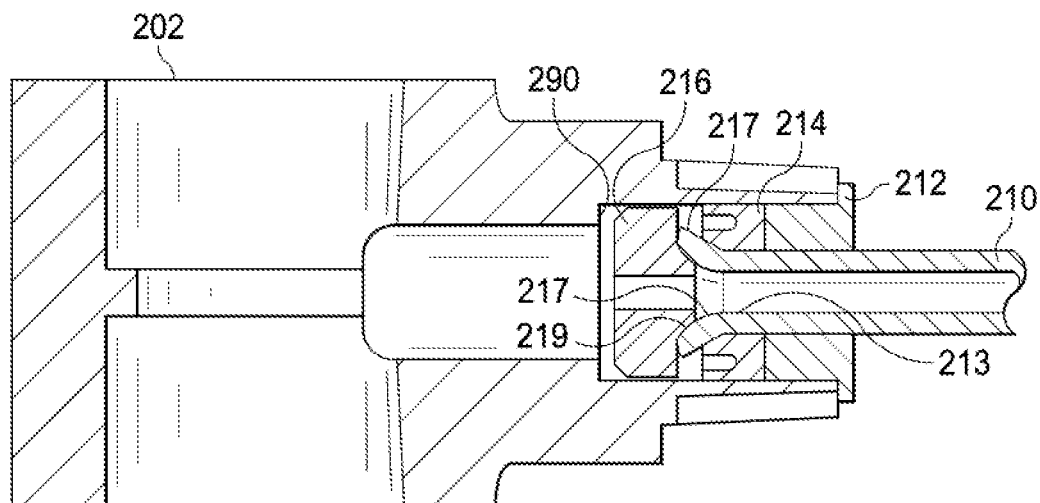
FIGS. 11A and 11B illustrate one embodiment of a tee body.
Figure 11B:
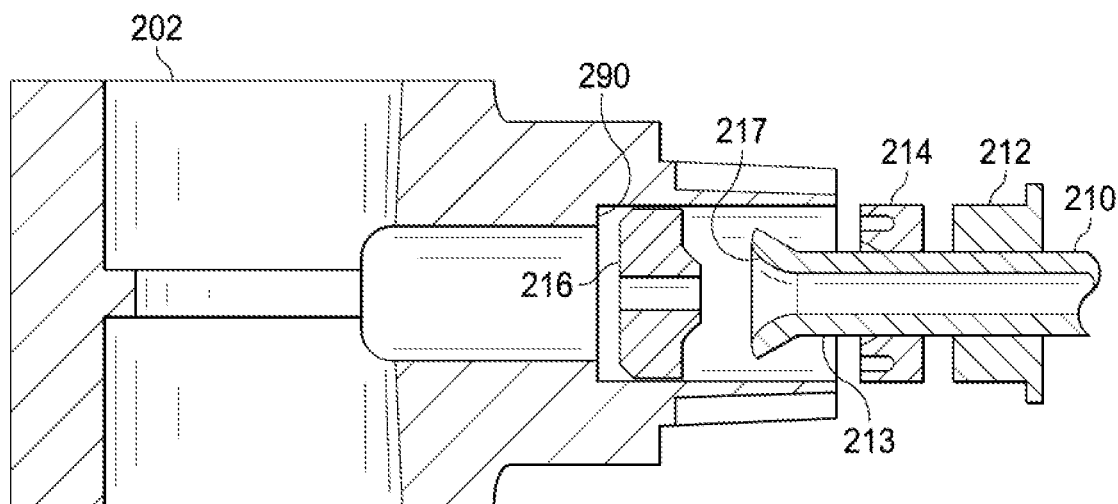

FIGS. 11A and 11B illustrate one embodiment of an air connection or tee body 202, such as that more fully described and illustrated in U.S. Pat. No. 6,698,482, entitled "Rotary Air Connection With Bearing For Tire Inflation System," which is hereby incorporated wholly by reference. The second end 213 of the tubular member 210 may be disposed in the tee body. An annular seal 214 may provide a sealing interface between the tubular member 210 and the tee body 202. The end of the tubular member 210 may be flared 217 to provide a bearing surface 219 for contact with a bearing 216. A telescope cap 212 may hold the bearing 216, annular seal 213 and tubular member 210 assembled with the tee body 202.

Of course, any other suitable tee body 202 may be used. For example, the tee body 202 may include a Deublin-style rotary union, or a face seal, or a ball joint, such as those variously disclosed in U.S. Pat. Nos. 5,538,062, 6,968,882, 7,273,082, 6,325,124, 8,746,305 or U.S. Pub. App. No. 2009/0283190, each of which is wholly incorporated herein by reference.

If the vehicle has a flat tire, then the escaping air may be detected by the flow switch 172, which may actuate the warning system light 174 showing FIG. 1. The warning system light 174 may be positioned within view of the driver of the vehicle 100 to indicate a problem. Of course, a warning buzzer or audible alarm may be used in place of the light 174. The operator may quickly determine whether the warning system light 174 indicates a pressure leak in the tires 110.

In view of the foregoing, therefore, various embodiments may be discerned. In some embodiments, a tire inflation system for a steer-axle wheel end assembly having a steer-axle spindle and a tire may comprise: a pressurized fluid supply; the steer-axle spindle pivotably mounted to a steer axle, the steer-axle spindle having an inner face facing the steer axle and having an outer end, the steer-axle spindle forming an axial channel along the central axis of the steer-axle spindle, the axial channel extending from the inner face to the outer end and in sealed fluid communication with the pressurized fluid supply; and a rotary union sealingly mourned to the axial channel at an outer end of the steer-axle spindle, the rotary union being in sealed fluid communication with the pressurized fluid supply and with the tire.

In such embodiments, the rotary union may further comprise a tee body; a first annular seal circumferentially disposed in the axial channel; a second annular seal disposed in the tee body; and a tubular member sealingly disposed between the first seal and the annular seal. The tubular member may be rigid, or flexible, or comprise a rigid portion and a flexible portion. The tubular member may be rotatably and translatably disposed in both the first annular seal and the second annular seal. The second annular seal may be circumferentially disposed in the tee body, and the tubular member may be rotatably and translatably disposed in one of the first annular seal and the second annular seal. A filter may be disposed at an end of the tubular member, or in the tubular member. The first annular seal may comprise an elastomeric o-ring and the second annular seal may comprise a lip seal. The first annular seal may comprise an elastomeric o-ring and the second annular seal comprise an elastomeric o-ring. The first annular seal may comprise a lip seal and the second annular seal may comprise an elastomeric o-ring. The first annular seal may comprise a lip seal and the second annular seal may comprise a lip seal.

In various embodiments, the rotary union may comprise a body portion rotatable with respect to a steer-axle spindle, and a stator portion non-rotatable with respect to a steer-axle spindle, the stator portion being in sealed fluid communication with a pressurized fluid supply.

In further embodiments, the system of claim 1, the spindle may further form a radial channel or cross-channel, the radial channel or cross-channel extending radially or otherwise away from the axial channel through the spindle and being in sealed fluid communication with the pressurized fluid supply so as to allow fluid to flow from the radial channel or cross-channel to the axial channel; and the axial channel being sealed at the inner face. The radial channel or cross-channel may be formed by drilling, or the spindle may be cast, machined or manufactured with a radial channel or cross-channel.

In some embodiments, the rotary union may comprise a non-rotating steel portion and an abutting rotatable graphite portion, the steel portion and the graphite portion forming a face seal.

In yet other embodiments, a fluid filter may be disposed between the pressurized fluid supply and the rotary union. A fluid hose may provide sealed fluid communication between the rotary union and the tire.

In some embodiments, a breakaway tire valve may be mounted to a wheel of steer-axle wheel end assembly, the breakaway tire valve being in fluid communication with the tire; and a fluid hose may provide sealed fluid communication between the rotary union and the breakaway tire valve. Tubing may provide sealed fluid communication between the rotary union and the pressurized fluid supply. In other embodiments, tubing may provide sealed fluid communication to the axial channel at the inner face of the steer axle spindle. In yet further embodiments, a fitting may connect the tubing to the inner face, the fitting comprising a fluid filter.

In some embodiments, a rotary union may comprise a stator sealingly disposed in the axial channel at the outer end of the steer-axle spindle; a first annular seal circumferentially disposed in the stator; a rotary body; a second annular seal circumferentially disposed in the rotor body; and a tubular member sealingly disposed between the first annular seal and the second annular seal. The rotary body may be mounted to the exterior of a hubcap, or mounted to the interior of a hubcap, or the rotary body may comprise a hubcap. The tubular member may be rigid, or flexible, or comprise a rigid portion and a flexible portion. The first annular seal may be an elastomeric O-ring and the second annular seal may be a lip seal. The first annular seal may be an elastomeric o-ring and the second annular seal may be an elastomeric o-ring. The first annular seal may be a lip seal and the second annular seal may be an elastomeric o-ring. The first annular seal may be a lip seal and the second annular seal may be a lip seal. The tubular member may be rotatably and translatably disposed in both the first annular seal and the second annular seal. The second annular seal may be circumferentially disposed in the tee body, and the tubular member may be rotatably and translatably disposed in one of the first annular seal and the second annular seal. The stator is may be in fluid communication with the pressurized fluid supply through a fluid conduit.

In some embodiments, a method of providing a tire inflation system for a steer-axle wheel end assembly having a tire and a steer-axle spindle pivotally mounted to steer axle may comprise forming an axial channel along the central axis of the steer-axle spindle from an outer end to an inner face facing the steer axle; mounting a rotary union to said wheel end assembly; providing sealed fluid communication from the rotary union to a pressurized fluid supply through the axial channel; and providing sealed fluid communication from the rotary union to the tire. The axial channel may be formed by drilling, or the spindle may be cast, machined or manufactured with an axial channel.

In some embodiments, the method may comprise mounting the rotary union to a hubcap. The rotary union may be part of a hubcap, in some embodiments.

In some embodiments, the method may further comprising mounting the rotary union in sealed fluid communication with the axial channel at the outer end of the steer axle spindle; and providing a fluid conduit in sealed fluid communication with the axial channel at the inner face of the steer axle spindle and with the pressurized fluid supply.

In yet other embodiments, the method may further comprise mounting the rotary union in sealed fluid communication with the pressurized fluid supply through a fluid conduit extending through the axial channel. The method may yet further comprise disposing a non-rotatable portion of the rotary union in sealed communication with the pressurized fluid supply; and disposing a rotatable portion of the rotary union in sealed communication with the tire.

In some embodiments of the methods, the rotary union may comprise a tubular member, and the method may further comprise disposing an annular seal circumferentially in the axial channel near the outer end of the steer-axle spindle; and sealingly disposing the tubular member in the annular seal. The tubular member may be rotatably disposed in the annular seal. The tubular member may be translatably disposed in the annular seal.

In some embodiments of the methods, the rotary union may comprise a first annular member having a tubular member sealingly disposed therein, and the method may further comprise disposing a second annular seal circumferentially in the axial channel near the outer end of the steer-axle spindle; and sealingly disposing the tubular member in the annular seal. The tubular member may be rotatably disposed in either the first annular seal or in the second annular seal. The tubular member may be rotatably disposed in both the first annular seal and in the second annular seal.

The rotary union may, in some embodiments, comprise a rotatable graphite portion and the tubular member may comprise a steel portion, the rotatable graphite portion and the steel portion abutting to form a face seal; and the tubular member may be non-rotatingly disposed in the annular seal.

In yet other embodiments, a method of providing a tire inflation system for a steer-axle wheel end assembly having a tire and a steer-axle spindle pivotally mounted to a steer axle may comprise forming a cross-channel from an outer surface of the steer-axle spindle to a central axis of the steer-axle spindle; forming an axial channel along the central axis of the steer-axle spindle from an outer end to the cross-channel; mounting a rotary union to said wheel end assembly; providing sealed fluid communication from the rotary union to a pressurized fluid supply through the axial channel and the cross-channel; and providing sealed fluid communication from the rotary union to the tire. The axial channel may be formed by drilling, or the spindle may be cast, machined or manufactured with an axial channel.

In some embodiments, a method of providing a tire inflation system for a steer-axle wheel end assembly having a tire and a steer-axle spindle pivotally mounted to a steer axle may comprise mounting a rotary union to said wheel end assembly; providing sealed fluid communication from the rotary union to a pressurized fluid supply through an axial channel extending along the central axis of the steer-axle spindle from an outer end to an inner face facing the steer axle; and providing sealed fluid communication from the rotary union to the tire.

In other embodiments, a method of providing a tire inflation system for a steer-axle wheel end assembly having a tire and a steer-axle spindle pivotably mounted to a steer axle may comprise mounting a rotary union to said wheel end assembly; providing sealed fluid communication from the rotary union to a pressurized fluid supply through a cross-channel extending from an outer surface of the steer-axle spindle to a central axis of the steer-axle spindle and through an axial channel extending along the central axis of the steer-axle spindle from an outer end to the cross-channel; and providing sealed fluid communication from the rotary union to the tire.

In yet further embodiments, a steer-axle wheel end assembly may have a tire mounted to a steer-axle spindle pivotably connected to a steer axle, the steer-axle spindle having a channel formed therein. A tire inflation system may comprise a rotary union mounted to the steer-axle wheel end assembly, the rotary union being in sealed fluid communication with a pressurized fluid supply through the channel, and with a tire. In some embodiments, the rotary union and the pressurize fluid supply may each be in sealed fluid communication with the channel. In other embodiments, the rotary union may be in sealed fluid communication with a pressurized fluid supply through a fluid conduit disposed through the channel. In some embodiments, the channel may comprise an axial channel extending along the axis of tire rotation. The channel may further comprise a cross-channel extending from the axial channel to a surface of the steer-axle spindle.

Although the disclosed subject matter and its advantages have been described in detail, it should be understood that various changes, substitutions and alterations can be made herein without departing from the invention as defined by the appended claims. Moreover, the scope of the claimed subject matter is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods or steps.

We claim:

1. A tire inflation system for a steer-axle wheel end assembly having a steer-axle spindle and a tire, the system comprising:
   a pressurized fluid supply;
   the steer-axle spindle pivotably mounted to a steer axle, the steer-axle spindle having an inner face facing the steer axle and having an outer end, the steer-axle spindle forming an axial channel along the central axis of the steer-axle spindle, the axial channel extending from the outer end and being in sealed fluid communication with the pressurized fluid supply; and
   a rotary union sealingly mounted to the axial channel at the outer end of the steer-axle spindle, the rotary union being in sealed fluid communication with the pressurized fluid supply and with the tire, the rotary union comprising:
   a rotary body being configured to mount to the exterior or interior of a hubcap, or comprising part of a hubcap;
   a stator disposed in the axial channel at the outer end of the steer-axle spindle;
   a first seal circumferentially disposed in the stator, the first seal being an annular seal;
   a second seal disposed in the rotary body; and
   a tubular member sealingly disposed between the first annular seal and the second seal, wherein the tubular member comprises a rigid portion and a flexible portion.

2. The system of claim 1, further comprising a filter disposed at an end of the stator.

3. The system of claim 1, further comprising a filter disposed in the stator.

4. The system of claim 1, further comprising a fluid filter disposed between the pressurized fluid supply and the rotary union.

5. The system of claim 1, the axial channel extending from the outer end to the inner face.

6. The system of claim 5, further comprising tubing providing sealed fluid communication to the axial channel at the inner face of the steer axle spindle.

7. The system of claim 6, further comprising a fitting connecting the tubing to the inner face, the fitting comprising a fluid filter.

8. The system of claim 1, the spindle further forming a radial channel, the radial channel extending radially from the axial channel through the spindle and being in sealed fluid communication with the pressurized fluid supply so as to allow fluid to flow from the radial channel to the axial channel.

9. The system of claim 1, further comprising a fluid hose providing sealed fluid communication between the rotary union and the tire.

10. The system of claim 1, further comprising a breakaway tire valve mounted to a wheel of a steer-axle wheel end assembly, the breakaway tire valve being in fluid communication with the tire; and a fluid hose providing sealed fluid communication between the rotary union and the breakaway tire valve.

11. The system of claim 1, further comprising tubing providing sealed fluid communication between the stator and the pressurized fluid supply through the axial channel.

12. A tire inflation system for a steer-axle wheel end assembly having a steer-axle spindle and a tire, the system comprising:
   a pressurized fluid supply;
   the steer-axle spindle pivotably mounted to a steer axle, the steer-axle spindle having an inner face facing the steer axle and having an outer end, the steer-axle spindle forming an axial channel along the central axis of the steer-axle spindle, the axial channel extending from the outer end and being in sealed fluid communication with the pressurized fluid supply; and
   a rotary union sealingly mounted to the axial channel at the outer end of the steer-axle spindle, the rotary union being in sealed fluid communication with the pressurized fluid supply and with the tire, the rotary union comprising:
   a rotary body being configured to mount to the exterior or interior of a hubcap, or comprising part of a hubcap;
   a stator disposed in the axial channel at the outer end of the steer-axle spindle;
   a first seal circumferentially disposed in the stator, the first seal being an annular seal;

a second seal disposed in the rotary body, wherein the second seal is an annular seal circumferentially disposed in the rotary body, and; and a tubular member sealingly disposed between the first annular seal and the second seal, wherein the tubular member is rotatably, pivotably and translatably disposed in the first seal and rotatably and pivotably disposed in the second seal.

13. The system of claim 12, wherein the first seal is an elastomeric o-ring or a lip seal, and the second seal is an elastomeric o-ring or a lip seal.

14. A tire inflation system for a steer-axle wheel end assembly having a steer-axle spindle and a tire, the system comprising:

a pressurized fluid supply;

the steer-axle spindle pivotably mounted to a steer axle, the steer-axle spindle having an inner face facing the steer axle and having an outer end, the steer-axle spindle forming an axial channel along the central axis of the steer-axle spindle, the axial channel extending from the outer end and being in sealed fluid communication with the pressurized fluid supply; and a rotary union sealingly mounted to the axial channel at the outer end of the steer-axle spindle, the rotary union being in sealed fluid communication with the pressurized fluid supply and with the tire, the rotary union comprising:

a rotary body being configured to mount to the exterior or interior of a hubcap, or comprising part of a hubcap;

a stator disposed in the axial channel at the outer end of the steer-axle spindle;

a first seal circumferentially disposed in the stator, the first seal being an annular seal;

a second seal disposed in the rotary body; and a tubular member sealingly disposed between the first annular seal and the second seal, the tubular member being non-rotating with respect to the steer axle spindle, the tubular member comprising a steel portion, the second seal comprising a face seal formed of the steel portion and an abutting rotatable graphite portion.

* * * * *